(12) United States Patent
Martin et al.

(10) Patent No.: US 9,422,098 B2
(45) Date of Patent: Aug. 23, 2016

(54) POUCH FOR FRESH PRODUCE ITEM AND METHOD

(71) Applicant: Dow Global Technologies LLC, Midland, MI (US)

(72) Inventors: Jill M. Martin, Pearland, TX (US); Haley Lowry, Houston, TX (US); James F. Warner, Chicago, IL (US); Jihoon Kim, Chicago, IL (US); Thomas A. Herbert, Oak Park, IL (US)

(73) Assignee: Dow Global Technologies LLC, Midland, MI (US)

( * ) Notice: Subject to any disclaimer, the term of this patent is extended or adjusted under 35 U.S.C. 154(b) by 15 days.

(21) Appl. No.: 14/104,132

(22) Filed: Dec. 12, 2013

(65) Prior Publication Data

US 2014/0370160 A1    Dec. 18, 2014

Related U.S. Application Data

(63) Continuation-in-part of application No. 29/457,793, filed on Jun. 13, 2013, now Pat. No. Des. 719,035.

(51) Int. Cl.
*B65D 81/34* (2006.01)
*A23L 1/216* (2006.01)
(Continued)

(52) U.S. Cl.
CPC ............ *B65D 81/3461* (2013.01); *A23L 1/216* (2013.01); *B32B 3/266* (2013.01);
(Continued)

(58) Field of Classification Search
CPC . B65D 81/3446; B65D 81/3461; B32B 27/08

USPC .................. 426/107, 110, 112, 113, 118, 127
See application file for complete search history.

(56) References Cited

U.S. PATENT DOCUMENTS 1,419,739 A    6/1922    Kniep
D258,204 S    2/1981    Rudenschnold
(Continued)

FOREIGN PATENT DOCUMENTS

EP    0389257 A1    9/1990
EP    2505513 A1    10/2012
(Continued)

OTHER PUBLICATIONS

Ore-Ida ("Steam n' Mash Cut Russet Potatoes"), Pub. online Dec. 14, 2012. http://web.archive.org/web/20121214062217/http://www.ore-ida.com/Products/S/Steam-n-Mash-Cut-Russet-Potatoes?*
(Continued)

*Primary Examiner* — Drew Becker
*Assistant Examiner* — Bryan Kim
(74) *Attorney, Agent, or Firm* — Husch Blackwell LLP

(57) ABSTRACT

The present disclosure provides a pouch for holding a fresh produce item and a method. The pouch includes (A) a body composed of at least one flexible multilayer film having a haze value less than 20%. The body further includes a front wall, a rear wall, and a gusset panel that form a closed chamber. (B) The gusset panel includes a rim. (C) A fresh produce item is located in the closed chamber. (D) The pouch has a chamber-to-rim ratio (mm) from 6:1 to 200:1. At least a portion of at least one wall is transparent permitting a person to see the fresh produce item in the pouch. The method includes displaying the fresh produce item through at least one of the front wall or the rear wall at a chamber-to-rim ratio from 6:1 to 200:1.

13 Claims, 5 Drawing Sheets

(51) Int. Cl.
  B32B 7/12     (2006.01)
  B32B 27/08    (2006.01)
  B32B 27/32    (2006.01)
  B32B 27/36    (2006.01)
  B32B 3/26     (2006.01)
  B65D 75/00    (2006.01)
  B32B 27/20    (2006.01)
  B65D 75/56    (2006.01)
  B65D 75/58    (2006.01)

(52) U.S. Cl.
  CPC .............. *B32B 7/12* (2013.01); *B32B 27/08* (2013.01); *B32B 27/20* (2013.01); *B32B 27/32* (2013.01); *B32B 27/36* (2013.01); *B65D 75/008* (2013.01); *B32B 2270/00* (2013.01); *B32B 2307/31* (2013.01); *B32B 2307/412* (2013.01); *B32B 2307/414* (2013.01); *B32B 2307/518* (2013.01); *B32B 2307/724* (2013.01); *B32B 2307/75* (2013.01); *B32B 2439/46* (2013.01); *B32B 2439/70* (2013.01); *B65D 75/566* (2013.01); *B65D 75/5805* (2013.01); *B65D 81/3415* (2013.01); *B65D 81/3446* (2013.01); *B65D 2205/00* (2013.01); *B65D 2581/3427* (2013.01)

(56) References Cited

U.S. PATENT DOCUMENTS

| | | | |
|---|---|---|---|
| 4,322,465 A * | 3/1982 | Webster | B32B 27/32 206/484 |
| D263,899 S | 4/1982 | Lynn | |
| D278,974 S | 5/1985 | Ray | |
| 4,877,337 A | 10/1989 | Wood | |
| 5,350,240 A * | 9/1994 | Billman | B32B 29/00 383/104 |
| D384,273 S | 9/1997 | Willis | |
| D404,203 S | 1/1999 | Maier-Aichen | |
| 6,299,919 B1 * | 10/2001 | Knaus et al. | 426/115 |
| 6,423,356 B2 * | 7/2002 | Richison et al. | 426/118 |
| D484,699 S | 1/2004 | Enright | |
| D513,192 S | 12/2005 | Lin | |
| D537,632 S | 3/2007 | Quansah et al. | |
| D548,458 S | 8/2007 | Gregson et al. | |
| D555,352 S | 11/2007 | Lown et al. | |
| 7,458,195 B2 | 12/2008 | Bezek et al. | |
| D586,555 S | 2/2009 | Lown et al. | |
| D591,950 S | 5/2009 | Kim et al. | |
| D596,494 S | 7/2009 | Hendershot et al. | |
| D600,135 S | 9/2009 | Valentine et al. | |
| D606,754 S | 12/2009 | Baron | |
| 8,087,827 B2 | 1/2012 | Mir | |
| D665,269 S | 8/2012 | Robitalle | |
| 8,439,063 B2 | 5/2013 | Seline et al. | |
| D692,774 S | 11/2013 | Cheng | |
| D696,143 S | 12/2013 | Garbow | |
| 2002/0034622 A1 * | 3/2002 | Edwards et al. | 428/220 |
| 2002/0186900 A1 * | 12/2002 | Horne | B32B 29/00 383/104 |
| 2005/0079251 A1 | 4/2005 | Bell | |
| 2005/0230384 A1 | 10/2005 | Robison et al. | |
| 2005/0255200 A1 * | 11/2005 | Takahagi et al. | 426/113 |
| 2005/0276885 A1 | 12/2005 | Bennett | |
| 2005/0281494 A1 | 12/2005 | Allen et al. | |
| 2006/0204148 A1 * | 9/2006 | Kohn | A47F 9/042 383/9 |
| 2007/0087096 A1 * | 4/2007 | Mir | B65D 33/01 426/415 |
| 2007/0127853 A1 | 6/2007 | Bezek et al. | |
| 2009/0175563 A1 | 7/2009 | Weaver | |
| 2009/0208147 A1 | 8/2009 | Steele | |
| 2010/0136179 A1 * | 6/2010 | Mochizuki et al. | 426/87 |
| 2010/0266732 A1 * | 10/2010 | Thomas et al. | 426/113 |
| 2011/0103718 A1 | 5/2011 | Bosman | |
| 2011/0142377 A1 * | 6/2011 | Bradley | B32B 27/10 383/106 |
| 2011/0151070 A1 * | 6/2011 | Bell | B65D 81/2069 426/118 |
| 2011/0278311 A1 | 11/2011 | Chiquet et al. | |
| 2012/0207887 A1 * | 8/2012 | Battersby et al. | 426/127 |
| 2012/0219671 A1 * | 8/2012 | Siegel | B32B 27/08 426/132 |
| 2012/0279956 A1 * | 11/2012 | Bohrer | H05B 6/6408 219/730 |
| 2013/0071047 A1 * | 3/2013 | VanLoocke | B65D 33/16 383/95 |
| 2014/0363544 A1 * | 12/2014 | Putsch | B32B 27/08 426/106 |

FOREIGN PATENT DOCUMENTS

| | | |
|---|---|---|
| GB | 2478282 | 9/2011 |
| JP | 2005-306426 A | 11/2005 |
| JP | 2008-290737 A | 12/2008 |
| JP | 2009-067446 A | 4/2009 |
| WO | 2005/123196 A2 | 12/2005 |
| WO | 2009/067168 A1 | 5/2009 |
| WO | 2012/148895 A2 | 11/2012 |

OTHER PUBLICATIONS

Fresh N Tasty NPL, Published Oct. 10, 2010, http://web.archive.org/web/20101010170408/http://robbieflexibles.com/Solutions/Markets---Products/Products/Pouches/Fresh-N-Tasty%C2%AE-Pouches.aspx.*

Ore-Ida ("Steam N Mash"), Published Dec. 14, 2012, http://web.archive.org/web/20121214062217/http://www.oreida.com/Products/S/Steam-n-Mash-Cut-Russet-Potatoes?*

Mondi Packaging Flexibles GmbH, NeoSteam Packaging, 2008.

Fresh Summit Convention & Exposition, Oct. 15, 2010-Oct. 18, 2010, Exposition Module, http://vts.pma.com/expo10/ec/forms/attendee/index.aspx?content, printed Sep. 19, 2013.

http://cebule-kwiatowe.pl/planton-nawoz-do-warzyw-1-kg-i2322-k180.html, printed Dec. 6, 2013.

* cited by examiner

POUCH FOR FRESH PRODUCE ITEM AND METHOD

BACKGROUND

Known are the health benefits to the regular consumption of fresh produce (fresh fruits, fresh vegetables, and fresh grains). Health conscious consumers are increasingly searching for value-added fresh produce products.

At odds with the growing trend toward healthy eating is the reality that today's consumer is extremely pressed for time. The purchase of loose produce is time consuming as it requires time to select and inspect individual produce pieces, requires time to bag the produce pieces, and requires time to prepare the produce for eating. Conventional ready-to-eat (RTE) packaging for fresh produce includes packaging in which the produce can be steam cooked, such as in a microwave oven. However, such RTE packaging brings added expense to the produce item, deterring the consumer away from produce placed in RTE packaging.

Desirable would be packaging that not only preserves the freshness and taste of fresh produce, but also displays the fresh produce in an appealing manner, with the packaging also delivering the fresh produce in a cost-effective and convenient manner to the consumer.

SUMMARY

The present disclosure provides a pouch. In an embodiment, the pouch includes (A) a body composed of at least one flexible multilayer film having a haze value less than 20%. The body further includes (i) a front wall joined to a rear wall along a top seal, a first side seal, and a second side seal; and (ii) a gusset panel joining the front wall to the rear wall along a bottom of the pouch. The walls and the gusset panel form a closed chamber. (B) The gusset panel includes a rim. (C) A fresh produce item is located in the closed chamber. (D) The pouch has a chamber-to-rim ratio (mm) from 6:1 to 200:1.

The flexible multilayer film with less than 20% haze provides the pouch with at least one wall (or a portion of a wall not covered with print) that is transparent, or translucent. The flexible multilayer film with less than 20% haze enables a person looking at the pouch to view, or otherwise see, the fresh produce item through at least one wall, or a portion of the wall.

The present disclosure provides a method. In an embodiment, the method includes (1) providing a pouch. The pouch includes (A) a body composed of at least one flexible multilayer film having a haze value less than 20%. The body further includes (i) a front wall joined to a rear wall along a top seal, a first side seal, and a second side seal; and (ii) a gusset panel joining the front wall to the rear wall along a bottom of the pouch. The walls and the gusset panel form a closed chamber. (B) The gusset panel includes a rim. (C) A fresh produce item is located in the closed chamber. (D) The pouch has a chamber-to-rim ratio (mm) from 6:1 to 200:1. The method includes (2) displaying, through at least one of the walls, the fresh produce item at a chamber-to-rim ratio (mm) from 6:1 to 200:1.

DETAILED DESCRIPTION

Figure 1:
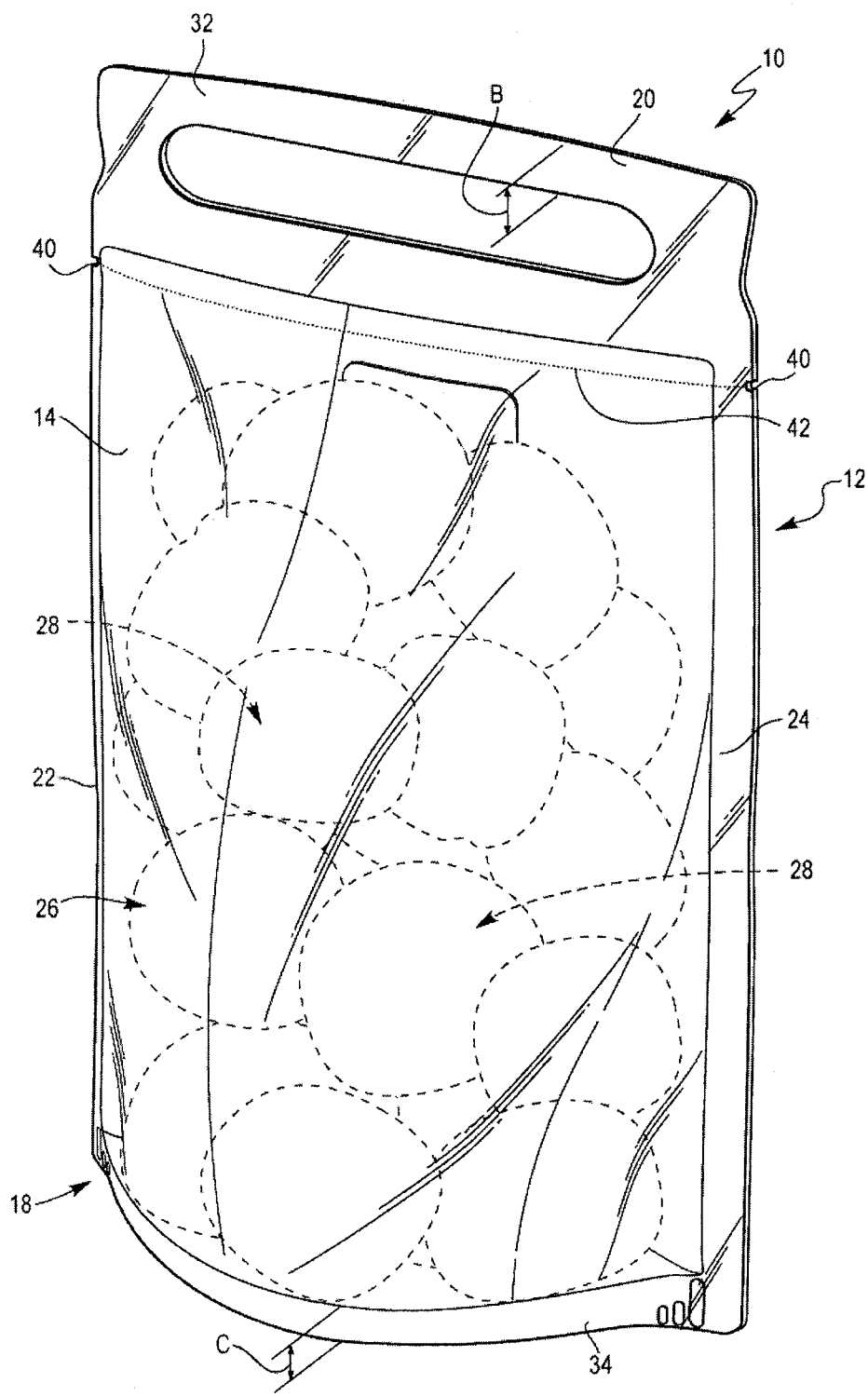
FIG. 1 is a front perspective view of a pouch in accordance with an embodiment of the present disclosure.
Figure 2:
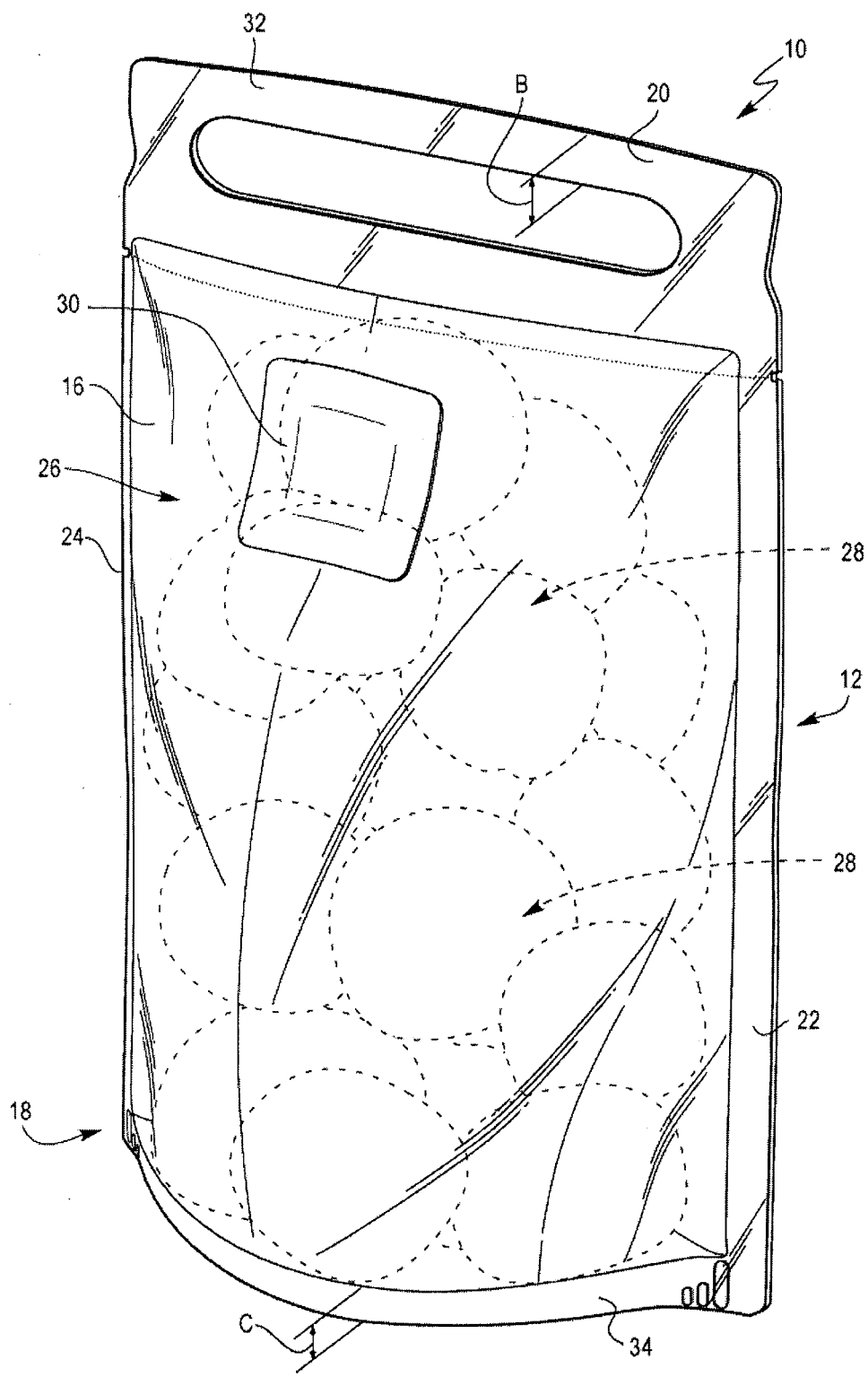
FIG. 2 is a rear perspective view of the pouch of FIG. 1.
Figure 3:
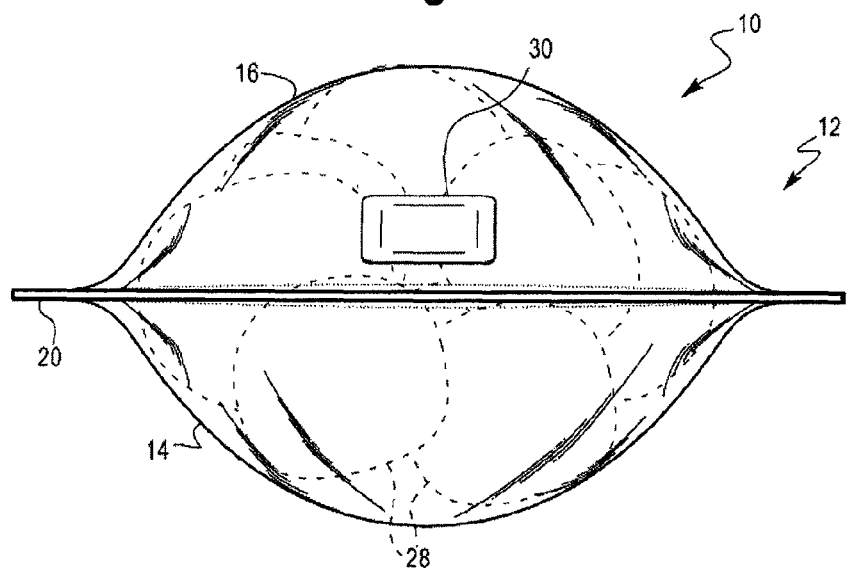
FIG. 3 is a top plan view of the pouch of FIG. 1.

The present disclosure provides a pouch for fresh produce. In an embodiment, the pouch includes at least one flexible multilayer film having a haze value less than 20%. The pouch includes (A) a body composed of at least one flexible multilayer film. The body further includes (i) a front wall joined to a rear wall along a top seal, a first side seal, and a second side seal. A gusset panel (ii) joins the front wall to the rear wall along a bottom of the pouch. The walls and the gusset panel form a closed chamber. (B) The gusset panel includes a rim. A fresh produce item (C) is located in the closed chamber. (D) The pouch has a chamber-to-rim ratio (mm) from 6:1 to 200:1. The multilayer film with less than 20% haze is sufficiently transparent such that the fresh produce item is visible, or otherwise viewable, through at least one wall, or a portion thereof.

A. Body

The present pouch includes a body. The body is composed of, or is otherwise formed from, at least one flexible multilayer film. The multilayer film is resilient, flexible, deformable, and pliable. Accordingly, so too is the body resilient, flexible, deformable, and pliable.

The flexible multilayer film has a haze value less than 20%. Haze is as measured in accordance with ASTM D1003. In an embodiment, the flexible multilayer flexible film has a haze value from greater than 0, or 1%, or 3%, or 5%, or 7%, or 9%, or 11% to 13%, or 15%, or 17%, or 19%.

In an embodiment, the flexible multilayer film has a haze value less than 10%. In a further embodiment, the flexible multilayer film has a haze value from greater than 0, or 1%, or 2%, or 3%, or 4% to 5%, or 6%, to 7%, or 8% or 9%.

The body can be made from a single flexible multilayer film (a film folded over upon itself and sealed). Alternatively, the body can be made from opposing webs that are formed and sealed, the opposing webs composed of the flexible multilayer film. The flexible multilayer film is made from one or more polymeric materials. Nonlimiting examples of suitable polymeric materials include olefin-based polymer, propylene-based polymer (including plastomer and elastomer, random copolymer polypropylene, homopolymer polypropylene, and propylene impact copolymer) and ethylene-based polymer (including plastomer and elastomer, high density polyethylene ("HDPE"), low density polyethylene ("LDPE"), linear low density polyethylene ("LLDPE"), and medium density polyethylene ("MDPE"), olefin block copolymer, polyethylene terephthalate ("PET"), oriented polyethylene terephthalate ("OPET"), nylon, biaxially oriented polypropylene (BOPP), ethylene vinyl alcohol (EVOH), functionalized ethylene-based polymers such as ethylene-vinyl acetate ("EVA"), maleic anhydride-grafted polyethylene, and ethylene acrylate copolymers, fluorinated ethylene propylene, blends thereof, and multilayer combinations thereof.

The flexible multilayer film has an innermost seal layer, an outer layer and optionally one or more intermediate layers sandwiched between the innermost seal layer and the outer layer. The intermediate layers may include barrier layers, structural layers, adhesive layers, and combinations thereof. The multilayer film may be produced by way of coextrusion, lamination, and combinations thereof. The outer layer is either a coextruded layer (for coextruded flexible multilayer film) or adhesively bound layer (for laminate flexible multilayer structure).

In an embodiment, the flexible multilayer film is a coextruded film with an innermost layer that is a seal layer, an outermost layer, and optional intermediate layers sandwiched between the seal layer and the outermost layer. In a further embodiment, print is directly applied to the outermost layer such that the outermost layer of the coextruded film is the print layer. The printing includes advertisement, branding, instructions for use, instructions for recycle, and any combination thereof.

In an embodiment, the flexible multilayer film is a laminate formed from a sealant web that is adhered to a print web. The sealant web may be a multilayer coextruded structure. The print web may be direct-printed and covered with a layer of protective varnish. Alternatively, the print web may be reverse-printed and laminated to the sealant web by applying an adhesive layer to the print web and/or to the sealant web. Either web may contain a filler to provide additional stiffness, or opacity, or both stiffness and opacity. The print web is subsequently laminated to the sealant web by applying an adhesive layer to the print web and/or the sealant web.

In an embodiment, the print layer (for coextruded film or laminate) is a polymeric material selected from biaxially or uniaxially oriented polypropylene (BOPP, OPP), polyethylene terephthalate (PET), bi-axially oriented PET (BOPET), and combinations thereof.

In an embodiment, the seal layer is a polymeric material selected from LLDPE (sold under the trade name DOWLEX™ (The Dow Chemical Company)), single-site LLDPE (substantially linear, or linear, olefin polymers, including polymers sold under the trade name AFFINITY™ (The Dow Chemical Company) for example), or propylene-based plastomers or elastomers and their blends, ethylene-vinyl acetate, and blends with polyisobutylene (PIB), or ionomers (AMPLIFY™).

In an embodiment, the seal layer is an ethylene-based polymer such as LLDPE and the print layer is a PET. The PET allows for printing to be easily placed directly on the flexible multilayer film because it does not stretch during the printing process. The LLDPE seal layer allows for the formation of heat seals during formation of the body.

In an embodiment, the flexible multilayer film exhibits suitable tear, toughness, and seal performance (i) to withstand a form, fill, and seal production process, and (ii) to meet the permeability requirements for the contents of the pouch.

In an embodiment, the flexible multilayer film has a thickness from 1.0 mils, or 2.0 mils, or 2.5 mils, or 3.0 mils, or 3.5 mils, to 4 mils, or 4.5 mils, or 5.0 mils, or 6.0 mils.

The body is made from a single flexible multilayer film, or two flexible multilayer films. In an embodiment, the body is made from two opposing webs, each web composed of the flexible multilayer film. Accordingly, the body is made from a first flexible multilayer film and a second flexible multilayer film. The composition of each web may be the same or different. In a further embodiment, the body is made from two webs, each web composed of a flexible multilayer film having the same structure and the same composition.

In an embodiment, the flexible multilayer film (or each of the first flexible multilayer film and the second flexible multilayer film) is a 3.5 mil laminate with the following structure: LLDPE/tie/PET with a thickness ratio of 71/3/26 and having one, some, or all of the following properties:

a secant modulus from 40,000 pounds per square inch (psi), or 60,000 psi, or 100,000 psi, or 200,000 psi to 300,000 psi, or 400,000 psi, or 500,000 psi, or 600,000 psi as measured in accordance with ASTM D 882;

a dart impact strength from 20 g to 400 g as measured in accordance with ASTM D 1709;

a tear strength (cross direction) from 500 g to 700 g as measured in accordance with ASTM D 624; and/or a tear strength (machine direction) from 200 g to 700 g as measured in accordance with ASTM D 624.

Permeability requirements, including oxygen transmission and moisture transmission may be tailored to meet the requirements of the particular produce to be packaged. The performance requirements may be met by selection of polymeric materials, by film thickness, by micro-perforations and/or other means for example cavitation of filled materials.

In an embodiment, each flexible multilayer film includes micro-perforations. The flexible multilayer film with micro-perforations has (i) an oxygen transmission rate from 90, or 100, or 110 to 120, or 130, or 140 cc/m$^2$/24 hours as measured in accordance with ASTM D3985; (ii) a water vapor transmission rate from 10, or 20, or 30 g/100 m$^2$/24 hours to 35, or 40 g/m$^2$/24 hours as measured in accordance with ASTM F1249; or (iii) both (i) and (ii).

In an embodiment, the flexible multilayer film includes micro-perforations and the pouch provides the fresh produce item with a shelf life from 1 day, or 2 days, or 3 days, or 4 days, or 5 days to 6 days, or 7 days, or 8 days, or 9 days, or 10 days after the fresh produce item is placed in the closed container.

In an embodiment, the flexible multilayer film includes an ultraviolet (UV) inhibitor.

In an embodiment, the flexible multilayer film (either coextruded film or laminate) includes print (as disclosed above) providing the pouch with one or more print surfaces. The pouch print surface(s) minimize, or otherwise reduce, UV light transmission through the pouch to reduce, or prevent, greening of the fresh produce item in the closed chamber.

i. Body Walls

The body includes a front wall joined to a rear wall. The front wall and the rear wall are joined along a top seal, a first side seal, and a second side seal. Nonlimiting procedures for joining the front wall to the rear wall include heat seal, ultrasonic seal, Radio-frequency (RF) sealing, weld, adhesive seal, and combinations thereof.

In an embodiment, the body is made from a single flexible multilayer film that is folded and heat sealed to form the seals, the gusset panel, the rim, and the floor.

In an embodiment, the body is made from two opposing webs, each web composed of the flexible multilayer film. Accordingly, the front wall is made from the first flexible multilayer film and the rear wall is made from the second flexible multilayer film. In a further embodiment, the structure and composition of the front wall is the same as the composition and structure of the rear wall (that is, the structure and composition of the first flexible multilayer film is the same as the structure and composition of the second flexible multilayer film).

The top seal extends longitudinally along the entire length, or along substantially the entire length, of the body. The first side seal and the second side seal are on opposing sides of the body. The top seal, the first side seal, and the second side seal extend along a portion of a common peripheral edge between the front wall and the rear wall.

In an embodiment, the top seal is a heat seal and has a seal strength from 20, or 30, or 40 Newtons (N)/25.4 millimeter (mm) to 50, or 60 N/25.4 mm as measured in accordance with ASTM F 88.

In an embodiment, the first side seal and the second side seal each is a heat seal and has a seal strength from 20, or 30, or 40 Newtons (N)/25.4 mm to 50, or 60 N/25.4 mm as measured in accordance with ASTM F 88.

In an embodiment, the top seal, the first side seal, and the second side seal each have the same heat seal strength. The heat seal strength for each of the three heat seals is from 20, or 30, or 40 Newtons (N)/25.4 mm to 50, or 60 N/25.4 mm as measured in accordance with ASTM F 88.

B. Gusset Panel

The body includes a gusset panel. The gusset panel is made from the same flexible multilayer film(s) as the walls. The gusset panel joins the front wall to the rear wall along the bottom of the body to form a base for the pouch. The gusset panel is formed by folding, shaping, and sealing a portion of the front wall with a portion of the rear wall. Nonlimiting procedures for joining the gusset panel to the walls include heat seal, ultrasonic seal, impulse, RF sealing, weld, adhesive seal, and combinations thereof. The front wall, rear wall, and gusset panel form a closed and watertight chamber. In other words, the gusset panel, the top seal, the first side seal, and the second side seal form a closed chamber in the body that is hermetically sealed.

The gusset panel includes a floor and a gusset seal which forms a rim (i.e., a peripheral rim) extending below the floor. During pouch formation, the rim is formed by the seal, typically a heat seal that makes the gusset of the pouch. The height of the gusset seal is the height of the rim. The gusset panel provides the pouch with a base having (1) the structural integrity to support the pouch and the fresh produce item in the chamber without leakage, and (2) provides the pouch the stability to stand vertically upright on the rim without tipping over. The rim contacts a horizontal surface, or a substantially horizontal surface, and holds or otherwise maintains the pouch in an upright position, or in a substantially upright position. In this sense, the present pouch is a "vertical stand-up flexible container," or a "vertical stand-up pouch," or a "stand-up pouch" or "SUP."

In an embodiment, the rim is a fold seal that is a heat seal and has a seal strength from 20, or 30, or 40 Newtons (N)/25.4 mm to 50, or 60 N/25.4 mm as measured in accordance with ASTM F 88.

The rim defines a footprint for the pouch. The "footprint" is the bottommost surface of the rim that contacts a support surface when the pouch is placed upright on the support surface. The rim also defines a footprint area. The "footprint area," as used herein, is the planar area under the floor surrounded by the rim footprint. The rim contacts and supports the pouch along the footprint when the pouch is placed on a support surface. In the upright position of the pouch (gusset panel on bottom and supporting the body from below), the rim supports the pouch and the floor is located at a position above the support surface. In this way, the rim forms the footprint for the container.

In an embodiment, the rim contacts the support surface and the floor does not contact the support surface.

The footprint can have a variety of shapes. Nonlimiting examples of suitable shapes for the footprint include circle, square, rectangle, triangle, ellipsoid, eye-shape, and teardrop.

In an embodiment, the footprint has an eye-shape.

In an embodiment, the footprint area is from 1000 mm$^2$, to 2000 mm$^2$. In a further embodiment, the footprint area is 1570 mm$^2$.

C. Fresh Produce Item

The pouch includes a fresh produce item in the closed chamber. A "produce item," as used herein, is an agricultural food product that is a fruit, a vegetable, a grain, and combinations thereof. A "fresh produce item," as used herein, is the produce item in the same state, or in substantially the same state, as when the produce item was harvested. The harvested produce item may or may not be subjected to a wash procedure or a cleaning procedure before being placed in the closed chamber.

The fresh produce item excludes pre-cooked produce, partially-cooked produce, half-cooked produce, frozen produce, de-hydrated produce, and irradiated produce.

In an embodiment, the fresh produce item may or may not include a refrigerated produce item. In a further embodiment, the fresh produce item excludes a refrigerated produce item.

Nonlimiting examples of fresh produce items include artichoke, asparagus, beans, beets, broccoli, brussel sprouts, carrots, cauliflower, celery, corn, cucumber, kohlrabi, lettuce, mushroom, nuts (almond, Brazil nut, cashew, chestnut hazelnut, Macadamia nut, peanut, pecan, pine nut, pistachio, walnut), okra, onion, parsnip, peas, potatoes, pumpkin, radish, rhubarb, rutabaga, spinach, squash, sweet potato, tomato, turnip, yams, and any combination thereof.

In an embodiment, the fresh produce item is a plurality of potatoes. In a further embodiment, the fresh produce item is a plurality of mini potatoes.

In an embodiment, from 0.5 pounds (lbs) (0.27 kg), or 1.0 lbs (0.45 kg) to 1.5 lbs (0.68 kg), or 2.0 lbs (0.91 kg), or 2.5 lbs (1.13 kg), or 3.0 lbs (1.36 kg) of fresh produce items are present in the closed chamber. In a further embodiment, from 0.5 lbs (0.23 kg) to 2.5 lbs (1.13 kg) of potatoes are present in the closed chamber.

In an embodiment, the front wall, the rear wall, the gusset panel, and any combination thereof includes printing thereon. The pouch has a print surface to prevent greening. In a further embodiment, the pouch includes print on from 20%, or 30%, or 40% to 50%, or 60%, or 70% of the external surface area of the pouch, the pouch still providing a transparent window to view the fresh produce item. It is understood that when print is present on the pouch, at least one wall provides a transparent area, or window, through which the fresh produce item can be seen by a person.

D. Chamber-to Rim Ratio

The pouch has a chamber-to-rim ratio from 6:1 to 200:1. The term, "chamber-to-rim ratio," as used herein, is the relationship of the height of the closed chamber to the height of the rim. The "height of the closed chamber" is the length from the bottom edge of the top seal to the top edge of the gusset seal. See distance E in FIG. 5. The "height of the rim" is the length from the top edge of the gusset seal to the bottom-most edge (the surface-contact portion) of the rim. See distance C in FIG. 5. Height is measured in millimeters (mm).

One or both walls have the chamber-to-rim ratio of 6:1 to 200:1. In an embodiment, the front wall and the rear wall each display the fresh produce item at a chamber-to rim ratio from 6:1 to 200:1.

In an embodiment, the chamber-to rim ratio is from 10:1 to 150:1, or from 15:1 to 130:1, or from 20:1 to 60:1, or from 30:1 to 50:1, or from 35:1 to 45:1.

In an embodiment, the height of the closed chamber is from 160 mm, or 170 mm, or 180 mm, or 190 mm, or 200 mm, or 210 mm, or 220 mm, or 230 mm, or 240 mm to 250 mm, or 260 mm, or 270 mm, or 280 mm, or 290 mm, or 300 mm, or 310 mm, or 325 mm, or 350 mm, or 375 mm, or 400 mm. The height of the rim is from 2 mm, or 4 mm, or 6 mm, or 8 mm, or 10 mm to 12 mm, or 14 mm, or 16 mm, or 18 mm, or 20 mm, or 30 mm, or 40 mm.

In an embodiment, the height of the closed chamber is from 180 mm to 300 mm and the height of the rim is from 4 mm to 10 mm. The chamber-to-rim ratio is from 18:1, or 30:1 to 45:1, or 75:1.

In an embodiment, the height of the closed chamber is from 200 mm to 280 mm and the height of the rim is from 4 mm to 6 mm. The chamber-to-rim ratio is from 33:1, or 47:1 to 50:1, or 70:1.

In an embodiment, the height of the closed chamber is 180 mm and the height of the rim is 30 mm. The pouch has a chamber-to-rim ratio of 6:1.

In an embodiment, the height of the closed chamber is 320 mm and the rim has a height of 40 mm. The pouch has a chamber-to-rim ratio of 8:1.

In an embodiment, the height of the closed chamber is 200 mm and the height of the rim is 2 mm. The pouch has a chamber-to-rim ratio of 10:1.

In an embodiment, the height of the closed chamber is 400 mm and the height of the rim is 40 mm. The pouch has a chamber-to-rim ratio of 10:1.

In an embodiment, the height of the closed chamber is 260 mm and the height of the rim is 6 mm. The pouch has a chamber-to-rim ratio of 43:1.

In an embodiment, the height of the closed chamber is 280 mm and the height of the rim is 6 mm. The pouch has a chamber-to-rim ratio of 46:1.

In an embodiment, the height of the closed chamber is 250 mm and the height of the rim is 5 mm. The pouch has a chamber-to-rim ratio of 50:1.

In an embodiment, the height of the closed chamber is 400 mm and the height of the rim is 4 mm. The pouch has a chamber-to-rim ratio of 100:1.

In an embodiment, the height of the closed chamber is 400 mm and the height of the rim is 2 mm. The pouch has a chamber-to-rim ratio of 200:1.

In an embodiment, the height of the closed chamber is from 200 mm to 280 mm and the height of the rim is from 4 mm to 6 mm. The chamber-to-rim ratio is from 33:1, or 47:1 to 50:1, or 70:1. The closed chamber includes from 0.23 kg (0.5 pounds) to 1.13 kg (2.5 pounds) of the fresh produce item. In a further embodiment, the closed chamber includes 0.68 kg (1.5 pounds) of the fresh produce item.

In an embodiment, the pouch has a chamber-to-base ratio from 1.5:1 to 3.0:1. The term, "chamber-to-base ratio," as used herein, is the relationship of the height (in mm) of the closed chamber to the length (in mm) of the base. The "length of the base" is the distance from the first side seal to the second side seal taken along the bottom of the pouch. See distance D in FIG. 4.

In an embodiment, the chamber-to base ratio is from 1.5:1, or 1.7:1, or 1.9:1, or 2.0:1 to 2.5:1, or 3.0:1.

In an embodiment, the pouch has a chamber to gusset ratio from 2:1 or 2.5:1 to 3:1, or 4:1. The term "chamber-to-gusset ratio," as used herein, is the relationship of the height of the closed chamber to the length of the gusset panel (in mm). The "length of the gusset" is the distance for the longest line between a front wall point on the rim and a rear wall point on the rim, the line being perpendicular to the base axis of the pouch. See distance G in FIG. 4. The "base axis" is the axis that extends through the first side seal and the second side seal, when viewing a bottom plan view of the pouch. See base axis F in FIG. 4.

The chamber-to-rim ratio of 6:1 to 200:1 (alone or in combination with the chamber-to-base ratio of 1.5:1 to 3.0:1 alone or in combination with the gusset ratio from 2:1 to 4:1) demonstrates an advantage of the present pouch. The height of the rim is minimized so as to maximize the chamber volume and still provide a vertical stand-up pouch. Concomitantly, the chamber-to-rim ratio of 6:1 to 200:1 maximizes the amount of fresh produce item contained in the chamber. In this way, the present pouch reduces the pouch material (thereby reducing production costs) to maximize fresh produce content, and further maximize visual appeal with the vertically stacked and ordered arrangement of the fresh produce items. The present stand-up pouch has at least one transparent wall (or a portion of a wall without print that is transparent) and displays the pieces of the fresh produce item in a unique elevated and vertically-suspended array. This elevated, vertical and suspended exhibition of the fresh produce item yields product differentiation (compared to other packaged fresh produce products) and increases shelf appeal. The flexible multilayer film with a haze less than 20% provides transparency and enables a consumer to view the fresh produce item through at least one wall. The present stand-up pouch improves point-of-use by reducing storage space in the home, kitchen, or pantry, for example.

As with the chamber-to rim ratio, the chamber-to-base ratio (and/or the gusset ratio) contributes to the stand-up feature of the present pouch and to the distinctive and unique shelf appeal provided by the vertically displayed and elevated fresh product item.

E. Handle

In an embodiment, the pouch includes a handle. The handle is formed in at least one of the seals. The handle may be formed in the top seal, the first side seal, the second side seal, or any combination thereof.

In an embodiment, the handle is formed in the top seal. The handle is located above the body. The handle is a cut-out handle formed by removing or cutting out a portion of the top seal. The handle is entirely contained in the top seal to reduce, or eliminate, rip, tear, or breakage of the handle.

The handle is configured (sized and shaped) to accommodate a person's hand. The handle enables ready and easy hand-carrying of the pouch. The handle is also suitable for hanging the pouch from a support structure, such as a hook, a door knob, or a cabinet handle, for example.

In an embodiment, the top seal has an area from 6000 mm$^2$ to 7500 mm$^2$ (excluding the opening for handle).

In an embodiment, a tear seal is located between the handle and the top of the body. Actuating the tear seal enables access to the fresh produce item located in the chamber. Opposing notches may be present in the side seals to initiate the tear seal. In a further embodiment, the tear seal is a re-sealable seal.

F. Steam Valve

In an embodiment, the pouch includes a steam valve. The steam valve is located on at least one of the front wall or the rear wall. A steam valve can be located on the front wall and/or the rear wall. In an embodiment, the steam valve is located on an upper portion of the rear wall.

In an embodiment, the steam valve includes a transparent film applied over an opening in one of the body walls. The opening is a pre-cut hole, a perforation (such as a perforated baffle), an array of a plurality of small perforations (such as micro-perforations), or any combination thereof. During cooking (such as microwave cooking), the valve opens at a predetermined temperature to open the pre-cut hole, allowing the steam to escape through the pre-cut hole. Depending on the steam valve's configuration, more or less steam will be permitted to escape.

The steam valve enables the fresh produce item to be cooked while contained within the pouch. For example, the pouch (with the fresh produce item therein) may be placed in a microwave oven for steam cooking.

The handle is formed in the top seal and is located from 150 mm, or 155 mm, or 160 mm, or 165 mm to 170, or 180 mm, or 190 mm, or 200 mm, or 205 mm, or 210 mm, or 250 mm, or 275 mm, or 300 mm away from the steam valve located on the rear wall. Applicant discovered the handle located 150-300 mm away from the steam valve advantageously ensures a user's hand will not be harmed by steam passing through the steam valve when the user is grasping or reaching for the handle.

G. Pouch

The present pouch is configured to maximize shelf life and maximize display and consumer appeal for the fresh produce item contained therein. The present pouch also provides two-fold convenience: (i) carrying convenience (or transport convenience); and (ii) food preparation convenience.

In an embodiment, the pouch is made from 90 wt % to 100 wt % ethylene-based polymer—the body being composed of flexible multiple layer film with layer materials selected from ethylene-based polymer such as LLDPE, LDPE, HDPE, and combinations thereof. The pouch made from 90 wt % to 100 wt % ethylene-based polymer is advantageous as it is readily recyclable.

In an embodiment, the pouch is a microwavable pouch. A "microwaveable pouch," as used herein, is a pouch that when subjected to microwave cooking, does not melt and retains its structural integrity, the pouch being self-venting so that steam generated during microwave cooking is released from the pouch through the steam valve.

In an embodiment, the pouch has a height from 200 mm or 250 mm, or 300 mm, to 325 mm, or 350 mm. In a further embodiment, the pouch has a height of 280 mm.

In an embodiment, the base has a length from 150 mm, or 160 mm, or 165 mm to 170 mm, or 175 mm, or 200 mm.

In an embodiment, the pouch has a height of 325 mm, the base has a length of 170 mm, and the pouch holds 1 lbs (0.45 kg) of the fresh produce item.

In an embodiment, the pouch has a height of 350 mm, the base has a length of 180 mm, and the pouch holds 1.5 lbs (0.68 kg) of potatoes.

The small presence of the rim unexpectedly optimizes pouch design and configuration by (1) enabling vertical and upright (stand-up) presentation of the fresh produce item thereby (2) differentiating the present pouch from other packaged fresh produce, (3) which advantageously increases consumer appeal for the pouch and (4) reduces the weight of the pouch. (5) The chamber-to-rim ratio and the resultant suspended and elevated vertical display of the fresh produce item in the closed chamber, and (6) the handle promote convenience and consumer appeal for the pouch. When the consumer sees the present pouch, the pouch conveys to the consumer a healthy, fresh food product, with four-fold convenience—convenience in inspection (transparent pouch wall provides view of fresh produce item); convenience in transport (hand—carry); convenience in storage (stand-up pouch); and convenience in food preparation (ready-to-eat from pouch or ready-to-cook in pouch). The present pouch advantageously provides a healthy "grab-and-go" fresh produce product that is attractive to health conscious consumers and attractive to time-strapped consumers.

The present pouch may comprise two or more embodiments disclosed herein.

H. Method

The present disclosure provides a method. The method includes (1) providing a pouch. The pouch can be any pouch as disclosed above. In an embodiment, the pouch includes at least one flexible multilayer film having a haze value less than 20%. The pouch includes (A) the body composed of at least one flexible multilayer film. The body further includes (i) the front wall joined to the rear wall along the top seal, the first side seal, and the second side seal. The gusset panel (ii) joins the front wall to the rear wall along the bottom of the pouch. The walls and the gusset panel form the closed chamber. The gusset panel includes the rim. The fresh produce item (C) is located in the closed chamber. The pouch has a chamber-to-rim ratio (mm) from 6:1 to 200:1. The method further includes (2) displaying, through at least one of the walls, the fresh produce item at a chamber-to-rim ratio (mm) from 6:1 to 200:1.

In an embodiment, the height of the closed chamber is from 180 mm to 300 mm and the height of the rim is from 4 mm to 10 mm. The chamber-to-rim ratio is from 18:1, or 30:1 to 45:1, or 75:1. The method includes displaying through at least one of the front wall or the rear wall, the fresh produce item at a chamber-to-rim ratio from 18:1, or 30:1 to 45:1, or 75:1.

In an embodiment, the height of the closed chamber is from 200 mm to 280 mm and the height of the rim is from 4 mm to 6 mm. The chamber-to-rim ratio is from 33:1, or 47:1 to 50:1, or 70:1. The method includes displaying through at least one of the front wall or the rear wall, the fresh produce item at a chamber-to-rim ratio from 33:1, or 47:1 to 50:1, or 70:1.

In an embodiment, the height of the closed chamber is 260 mm and the height of the rim is 6 mm. The pouch has a chamber-to-rim ratio of 43:1. The method includes displaying through at least one of the front wall or the rear wall, the fresh produce item at a chamber-to-rim ratio of 43:1.

In an embodiment, the height of the closed chamber is 280 mm and the height of the rim is 6 mm. The pouch has a chamber-to-rim ratio of 46:1. The method includes displaying through at least one of the front wall or the rear wall, the fresh produce item at a chamber-to-rim ratio of 46:1.

In an embodiment, the height of the closed chamber is from 200 mm to 280 mm and the height of the rim is from 4 mm to 6 mm. The chamber-to-rim ratio is from 33:1, or 47:1 to 50:1, or 70:1. The closed chamber includes from 0.23 kg (0.5 pounds) to 1.13 kg (2.5 pounds) of the fresh produce item. The method includes displaying, through at least one of the front wall or the rear wall, from 0.23 kg to 1.13 kg of the fresh produce item at a chamber-to-rim ratio from 33:1, or 47:1 to 50:1, or 70:1.

In an embodiment, the height of the closed chamber is from 200 mm to 280 mm and the height of the rim is from 4 mm to 6 mm. The chamber-to-rim ratio is from 33:1, or 47:1 to 50:1, or 70:1. The closed chamber includes from 0.68 kg (1.5 pounds) of the fresh produce item. The method includes displaying, through at least one of the front wall or the rear wall, 0.68 kg of the fresh produce item at a chamber-to-rim ratio from 33:1, or 47:1 to 50:1, or 70:1.

In an embodiment, the method includes, displaying, through the front wall and the rear wall, the fresh produce item at a chamber-to-base ratio (mm) from 1.5:1 to 3.0:1.

In an embodiment, the pouch includes a flexible multilayer film with micro-perforations. The method includes providing, with the pouch, the fresh produce item having a shelf life from 1 day, or 2 days, or 3 days, or 4 days, or 5 days to 6 days, or 7 days, or 8 days, or 9 days, or 10 days after the fresh produce item is placed in the closed chamber.

In an embodiment, the, pouch includes a handle formed in one of the seals. The method further includes carrying the pouch with the handle. In a further embodiment, the handle is formed in the top seal. The carrying can be hand-carrying or machine-carrying.

In an embodiment, the method includes carrying the pouch, by way of the handle, from a first location to a second location. The first location can be a harvest area, a production area, a distribution area, a grocery store, a market, and combinations thereof. The second location is any location other than the first location. In an embodiment, the second location is a food preparation location, a cooking location, and combinations thereof.

In an embodiment, the method includes carrying the pouch from a first location that is selected from a production area and a distribution area. The method includes carrying the pouch for the first location to a second location that is selected from a point-of-purchase location such as a grocery store, a market, a farmer's market, a food distribution center, and the like.

In an embodiment, the first location is a point-of-purchase location such as a grocery store, a market, a farmer's market, a food distribution center, and the like. The second location is a food preparation location, or a cooking location, such as a kitchen.

In an embodiment, the pouch includes a steam valve located on at least one of the walls. The method includes placing the pouch in a cooking device, and cooking the fresh produce item. The cooking device can be a stove, an oven, a microwave oven, a container of heated water, and any combination thereof.

In an embodiment, the method includes placing the pouch in a microwave oven and cooking the fresh produce item. The steam valve releases pressure and steam from the pouch during cooking. In a further embodiment, the pouch includes a handle in the top seal and the placing step includes grasping the pouch with the handle to place the pouch in the microwave oven.

In an embodiment, the method includes placing the pouch in a cooking device and cooking the fresh produce item while the fresh produce item is in the chamber of the pouch.

In an embodiment, the method includes placing the pouch in a microwave oven and steam cooking the fresh produce item. The steam valve releases pressure and steam from the pouch during cooking.

In an embodiment, the fresh produce item is a plurality of potatoes. The method includes placing the pouch in a microwave oven and steam cooking the potatoes. The steam valve releases pressure and steam from the pouch during microwave cooking.

In an embodiment, the method includes providing the pouch at a grocery store wherein a consumer grasps the handle of the pouch with her hand. The consumer hand-carries the pouch from the grocery store to a second location. In an embodiment, the second location is the consumer's residence.

The present method may comprise two or more embodiments disclosed herein.

DEFINITIONS

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

An "ethylene-based polymer," as used herein is a polymer that contains more than 50 mole percent polymerized ethylene monomer (based on the total amount of polymerizable monomers) and, optionally, may contain at least one comonomer.

Haze (percent) is measured in accordance with ASTM D 1003.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

Oxygen transmission rate (OTR) is measured at 23° C., 0% relative humidity and 1 atm pressure are measured with a MOCON OX-TRAN 2/20. The instrument is calibrated with National Institute of Standards and Technology certified Mylar film of known $O_2$ transport characteristics. The specimens are prepared and the OTR is performed according to ASTM D 3985.

"Polymer" means a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term interpolymer, usually employed to refer to polymers prepared from at least two types of monomers. It also embraces all forms of interpolymers, e.g., random, block, etc. The terms "ethylene/α-olefin polymer" and "propylene/α-olefin polymer" are indicative of interpolymers as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is obviously understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

Water Vapor Transmission Rate (WVTR) is measured at 38° C., 100% relative humidity and 1 atm pressure are measured with a MOCON Permatran-W 3/31. The instrument is calibrated with National Institute of Standards and Technology certified 25 µm-thick polyester film of known water vapor transport characteristics. The specimens are prepared and the WVTR is performed according to ASTM F1249.

Some embodiments of the present disclosure will now be described in detail in the following Examples.

EXAMPLES

The following is one embodiment of the present disclosure, as depicted in the drawings. While this describes one embodiment of the present disclosure, it will be apparent to those skilled in the art that various changes and modifications can be made without departing from the spirit and scope of the present disclosure.

FIG. 1 shows a front perspective view of a pouch 10 for a fresh produce item. The pouch 10 includes a flexible body 12 composed of a single flexible multilayer film. The flexible multilayer film is folded so that opposing sides are heat sealed to form a front wall 14 and a rear wall 16, and a gusset panel 18.

Nonlimiting examples of suitable flexible multilayer films for pouch 10 are Examples 1 and 2 shown in Table 1 below.

TABLE 1

Examples of flexible multilayer film

| Composition | PET/adh/DOWLEX ™ 2045G (50 micron sealant web) | PET/adh/DOWLEX ™ 2045G (100 micron sealant web) |
|---|---|---|
| Gauge (microns) | 63 (12/1/50) | 113 (12/1/100) |
| Gauge (mils) | 2.5 | 4.5 |
| Dart (g) | 404 | 680 |
| 1% Secant Modulus, MD/CD (psi) | 142/150 | 94/110 |
| Tear (MD/TD), g | 163/272 | 433/870 |
| Haze (%) | 13 | 12 |
| OTR (cc/m$^2$/24 hours)/WVTR (g/m$^2$/24 hours) | <140/40 | <140/40 |

Adh = adhesive layer (1 micron thick) ADCOTE ™ 577A/B polyurethane-based adhesive The front wall 14 is joined to the rear wall 16 along a top seal 20, a first side seal 22, and a second side seal 24. Each of the top seal 20, the first side seal 22, and the second side seal 24 has a thickness from 5.0 mil to 9.0 mil. The gusset panel 18 joins the front wall 14 to the rear wall 16 along the bottom of the pouch 10 to form a closed chamber 26.

A fresh produce item 28 is located in the closed chamber 26. The fresh produce item 28 is visible through the body 12 because the flexible multilayer film has a haze value less than 20% and is transparent. The OTR and the WVTR of the film prevents moisture from the fresh produce item from condensing on the interior surfaces of the walls and gusset panel. In an embodiment, the fresh produce item 28 is a plurality of fresh potatoes weighing 0.23 kg (0.5 lbs.) to 1.13 kg (2.5 lbs.).

Figure 5:
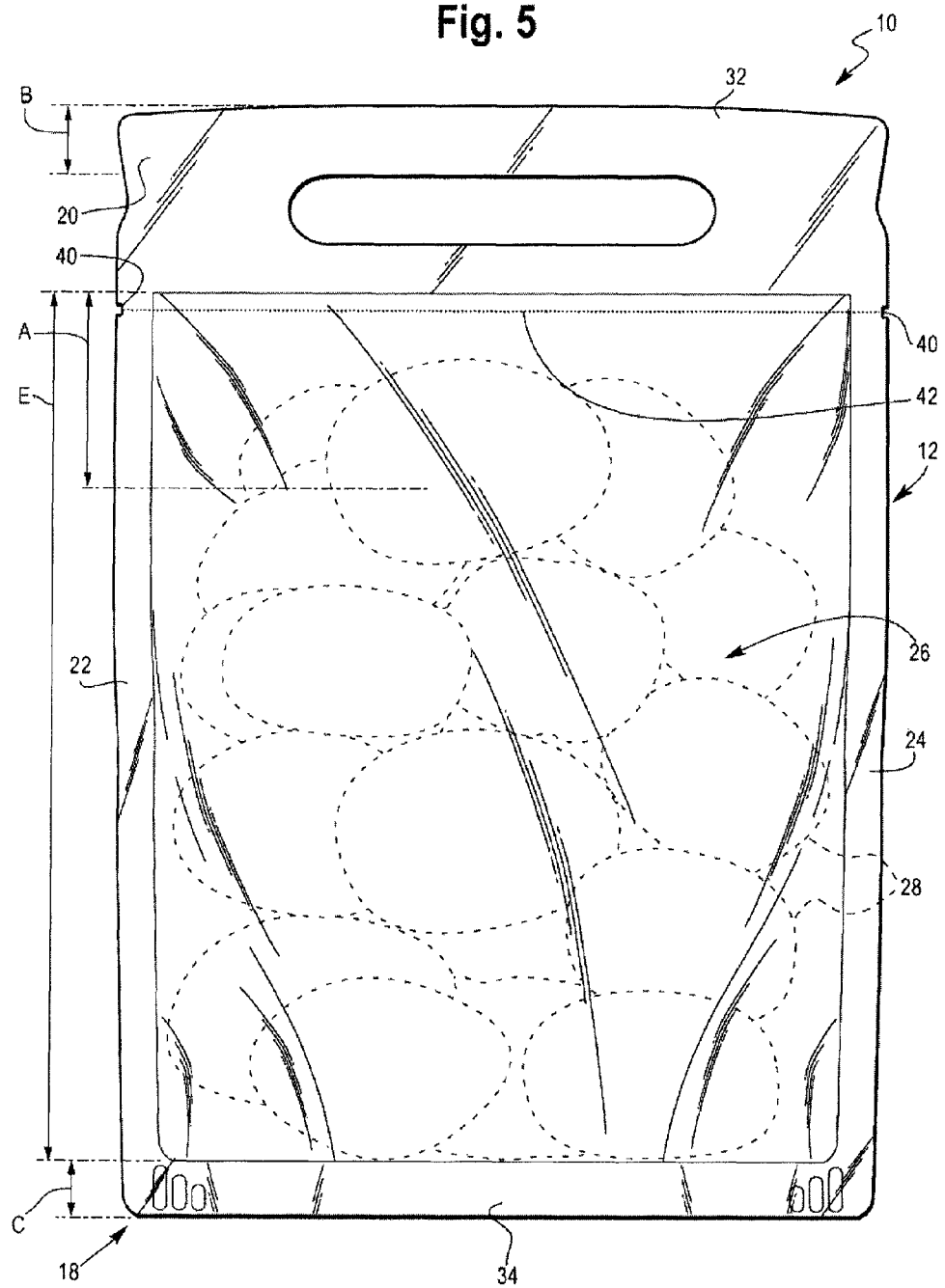
FIG. 5 is a front elevation view of the pouch of FIG. 1.

A steam valve 30 is located on the rear wall 16. A handle 32 is formed in the top seal. As shown in FIG. 5, a distance A extends between the handle 32 from the steam valve 30. Distance A separates the handle from the steam valve 30. When a user grasps the handle 32, distance A has a length sufficient to keep a user's hand away from steam emanating from the steam valve, such as when the pouch 10 is removed from a microwave oven after cooking, for example. In an embodiment, distance A has a length of 106 mm.

The handle 32 has a width B, as shown in FIG. 5. Distance B, provides the handle 32 with suitable strength and durability to support the pouch 10 when carried by a user. In an embodiment, width B has a length of 30 mm.

The gusset panel 18 includes a rim 34 and a floor 36. The rim 34 supports the pouch 10 in an upright position. The floor 36 supports the fresh produce item 28 in the closed chamber. The rim 34 is formed by folding the flexible multilayer film and heat sealing to form the gusset seal. The rim 34 has sufficient strength to support the contents of the fresh produce item such that the pouch 10 does not collapse or fall over. In this way, the rim 34 yields a pouch 10 that is a stand-up pouch. The rim 34 has a height C as shown in FIGS. 1, 2, 5, and 6.

Figure 4:
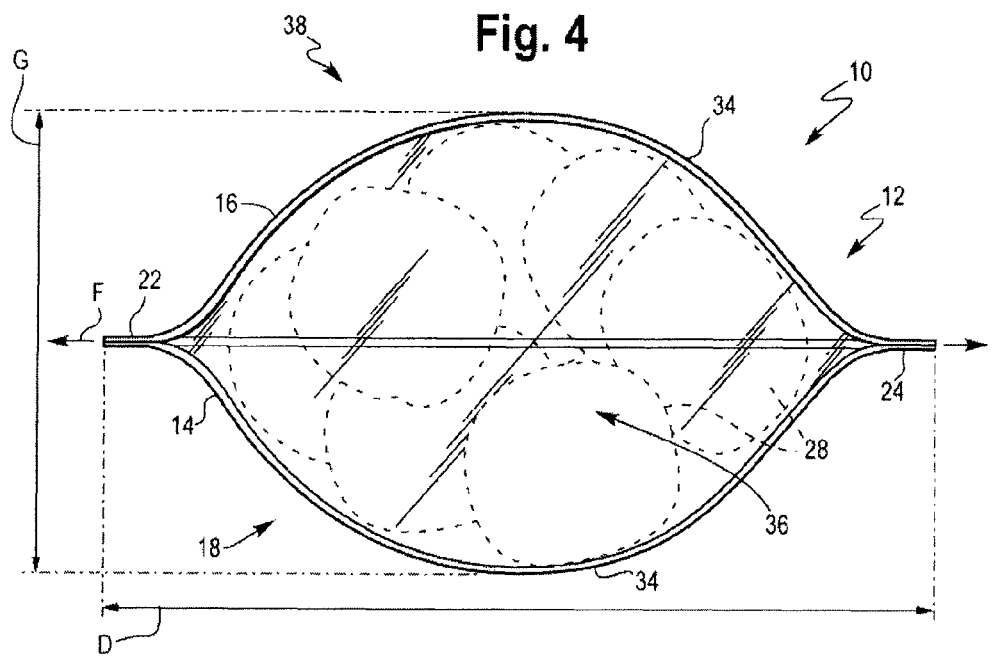
FIG. 4 is a bottom plan view of the pouch of FIG. 1.

The rim 34 defines a footprint 38. In an embodiment, the footprint has an eye-shape as seen in FIG. 4. The pouch 10 has a base length D shown in FIG. 4. Notches 40 promote actuation of a tear seal 42 as shown in FIG. 5.

Figure 6:
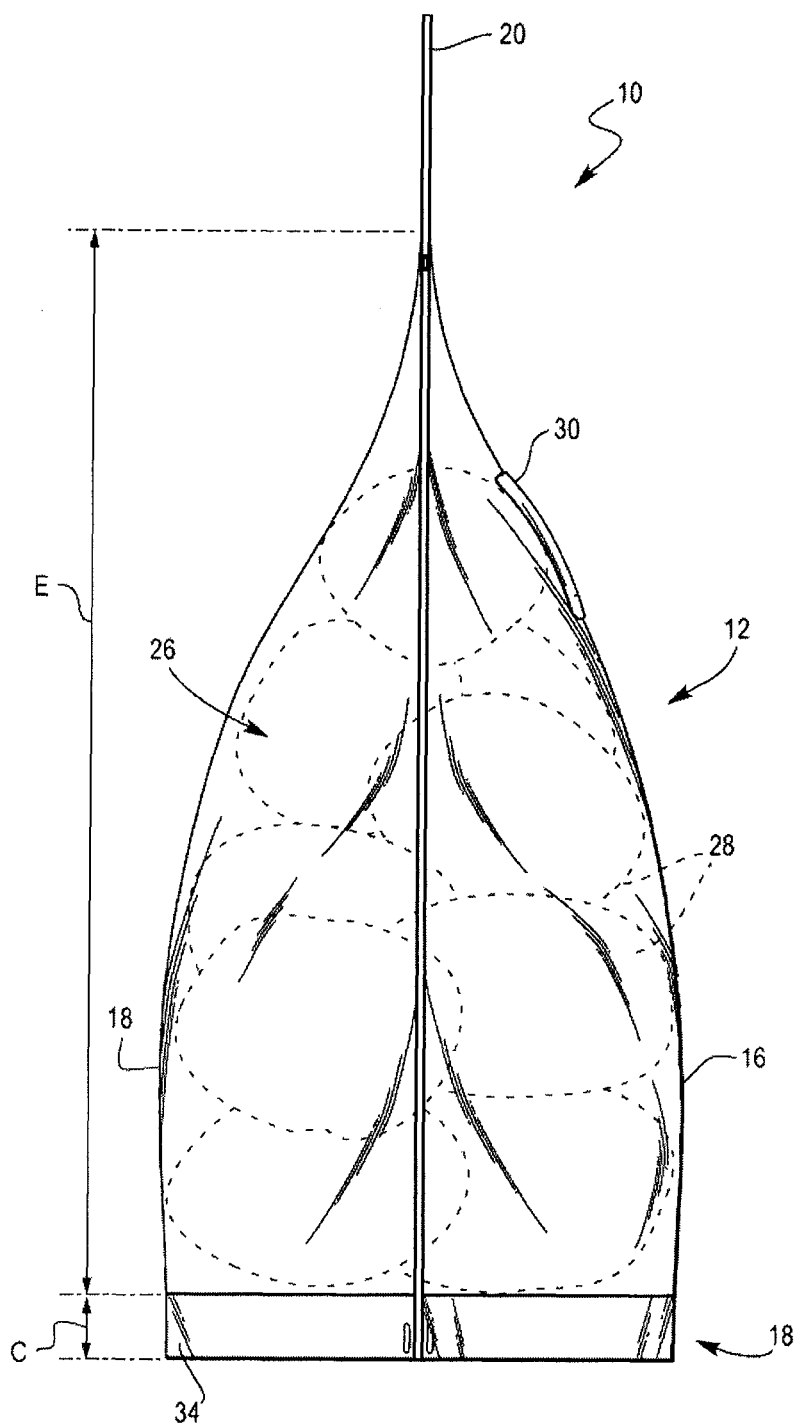
FIG. 6 is a side elevation view of the pouch of FIG. 1.

The closed chamber 26 has a height E as shown in FIGS. 5-6. In an embodiment, the length of height E is 260 mm. As shown in FIG. 4, the pouch 10 has a base axis F extending through the first side seal 22 and the second side seal 24 from the bottom plan view of the pouch. As shown in FIG. 4, the pouch 10 includes a gusset length G. Gusset length G is a line meeting the following four criteria: (i) the greatest distance between (ii) a rim point on the front wall side and (iii) a rim point on the rear wall side, (iv) the line being perpendicular to the base axis F.

In an embodiment, the height C of the rim 34 is 6 mm. The length D of the base is 170 mm. The height E of the closed chamber 26 is 260 mm. The pouch 10 has a chamber-to-rim ratio of 43:1 and/or a chamber-to-base ratio of 1.5.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A pouch comprising:
   A. a body consisting of one or two flexible multilayer films, each multilayer film consisting of three layers (a) a seal layer consisting of a linear low density ethylene-based polymer; (b) a print layer consisting of polyethylene terephthalate; and (c) an adhesive layer between the seal layer and the print layer, the multilayer film having an oxygen transmission rate from 90 cc/m$^2$/24 hours to 140 cc/m$^2$/24 hours and a haze value less than 20%, the body comprising:
      (i) a front wall joined to a rear wall along a top seal, a first side seal, and a second side seal;
      (ii) a gusset panel joining the front wall to the rear wall along a bottom of the pouch, the walls and the gusset panel forming a closed chamber, the closed chamber having a chamber height of 260 mm;
      (iii) a cut-out handle formed in the top seal; and
      (iv) a steam valve located from 150 mm to 160 mm below the cut-out handle on at least one of the walls;
   B. the gusset panel comprising a rim and a floor making the pouch a stand-up pouch;
   C. a fresh produce item in the closed chamber and displayed through at least one of the walls;
   D. the pouch has a chamber-to-rim ratio (mm) of 43:1; and
   E. the pouch has a chamber-to-base ratio (mm) of 1.5:1.

2. The pouch of claim 1, wherein the steam valve is located on the rear wall.

3. The pouch of claim 1 wherein the body comprises a first flexible multilayer film sealed to a second flexible multilayer film.

4. The pouch of claim 3 wherein each flexible multilayer film has a thickness from 2.5 mils to 4.5 mils and a haze value from greater than 0% to 13%.

5. The pouch of claim 1 wherein the rim defines a footprint having an eye shape.

6. The pouch of claim 1 wherein at least one of the top seal, the first side seal, and the second side seal has a seal strength from 20 N/25.4 mm to 60 N/25.4 mm.

7. The pouch of claim 4 wherein each flexible multilayer film has a water vapor transmission rate from 10 g/m$^2$/24 hours to 40 g/m$^2$/24 hours.

8. The pouch of claim 1 wherein the fresh produce item comprises from 0.23 kg to 1.13 kg of potatoes.

9. The pouch of claim 1 wherein the pouch is a microwavable pouch.

10. The pouch of claim 1 wherein the rim has a rim height of 6 mm.

11. The pouch of claim 1 wherein the pouch has a chamber-to-gusset ratio (mm) from 2:1 to 4:1.

12. The pouch of claim 2 wherein the steam valve comprises a transparent film applied over an opening in the rear wall.

13. The pouch of claim 12 wherein the opening in the rear wall is selected from the group consisting of a pre-cut hole, a perforated baffle, a plurality of micro-perforations, and combinations thereof.

* * * * *